Nov. 29, 1960 J. A. DLOUHY ET AL 2,962,589
DIAGNOSTIC CHAIR
Filed Sept. 12, 1958 2 Sheets-Sheet 1

Inventor
John A. Dlouhy
Donalee L. Tabern

Nov. 29, 1960   J. A. DLOUHY ET AL   2,962,589
DIAGNOSTIC CHAIR

Filed Sept. 12, 1958   2 Sheets-Sheet 2

Inventor
John A. Dlouhy
Donalee L. Tabern
By   Attys

United States Patent Office 2,962,589
Patented Nov. 29, 1960

2,962,589
DIAGNOSTIC CHAIR

John A. Dlouhy, 330 Washington Blvd., Oak Park, Ill., and Donalee L. Tabern, 210 Witchwood, Lake Bluff, Ill.

Filed Sept. 12, 1958, Ser. No. 760,620

17 Claims. (Cl. 250—50)

The present invention relates to an improved method and apparatus for measuring with a maximum of exactness, certainty and convenience, the uptake of a standard diagnostic dose of radioactive material by the thyroid gland of a patient in order to determine the basal metabolic rate of the individual.

The nuclear reactor, or as it is more commonly known, the atomic pile, has made possible the practical production of radioactive isotopes for use in medicine and industry. These isotopes have the property of disintegrating at fixed rates, that is, giving off radiation in all directions at measurable reliable rates. This property of isotopes is utilized in medical treatment and the present invention relates to the diagnostic medical use of a radioactive material which is internally taken by a patient in order to measure the radioactive uptake of the patient's thyroid gland. It has been found that the radioactive uptake of the thyroid is a direct indication and measure of the basal metabolic rate of the individual.

In this treatment, radio-iodine has the widest and most effective application of the isotopes. The thyroid takes up administered sodium radio-iodine and converts it to I-131 thyroxine. Since the gamma rays easily penetrate the neck tissues, the amount which has accumulated at any given time can be measured quantitatively, and calculated as a percentage of the administered dose. This has been correlated both theoretically and clinically with the degree of thyroid function. It may be thus effectively used as a measure of the basal metabolic rate of the individual.

In measuring the radiation count of the gamma rays, it is extremely important that the greatest degree of exactness possible is achieved. The matter of error is of extreme importance since the accurate measure of the metabolic rate will depend on the accuracy of measurement of the thyroid uptake. Factors such as the radiation of the surroundings, radiation of the rest of the body of the patient, and radiation of the dose administered to the patient must all be accurately and consistently measured.

An object of the present invention is to provide a method and a device for measuring the net uptake of a standard dose of radioactive material by a patient's thyroid gland with the greatest degree of exactness, certainty, and convenience.

A further object of the invention is to provide a method and a device for detecting with uniformity an accurate count of the radiation from a standard dose of radioactive material such as administered to a patient with the radiation modified by an amount equal to the modification caused by the patient's neck, and accurately positioning in a measuring location, at separate times, both the patient's thyroid gland and a phantom containing the standard dose.

Another object of the invention is to provide a method and a device for measuring the radiation count of sources other than the patient's thyroid such as the radiation of the radioactive material in the rest of the body of the patient, and the cosmic ray radiation of the surroundings.

A further object of the invention is to provide an improved device operable as a unit which will fixedly locate a patient's neck and thus his thyroid gland, and a standard diagnostic dose, relative to a radiation detection counter at a fixed distance therefrom for measuring the different radiation counts.

A still further object of the invention is to provide an improved chair assembly for use in accurately measuring the radiation count from a patient's body and thyroid with a radiation detector, said chair including an improved radiation shield for the patient's thyroid.

A feature of the invention is the provision of an improved chair assembly for measurement of a dose of radioactive material by a patient's thyroid gland, which includes an adjustable head rest, a phantom adjustably mounted on the chair having a compartment for receiving a standard radioactive diagnostic dose and affecting the radiation of the dose to the same degree as the patient's neck area, and having a lead shield with adjustable mounting means for swinging the shield about a horizontal axis and for swinging the shield between a radiation blocking and a non-blocking position, and provided with releasable adjustment means on the chair back for the phantom and the lead shield.

Other objects and advantages will become more apparent with the disclosure of the preferred embodiments of the invention in the specification, claims, and drawings, in which:

As shown on the drawings.

Figures 1, 2:
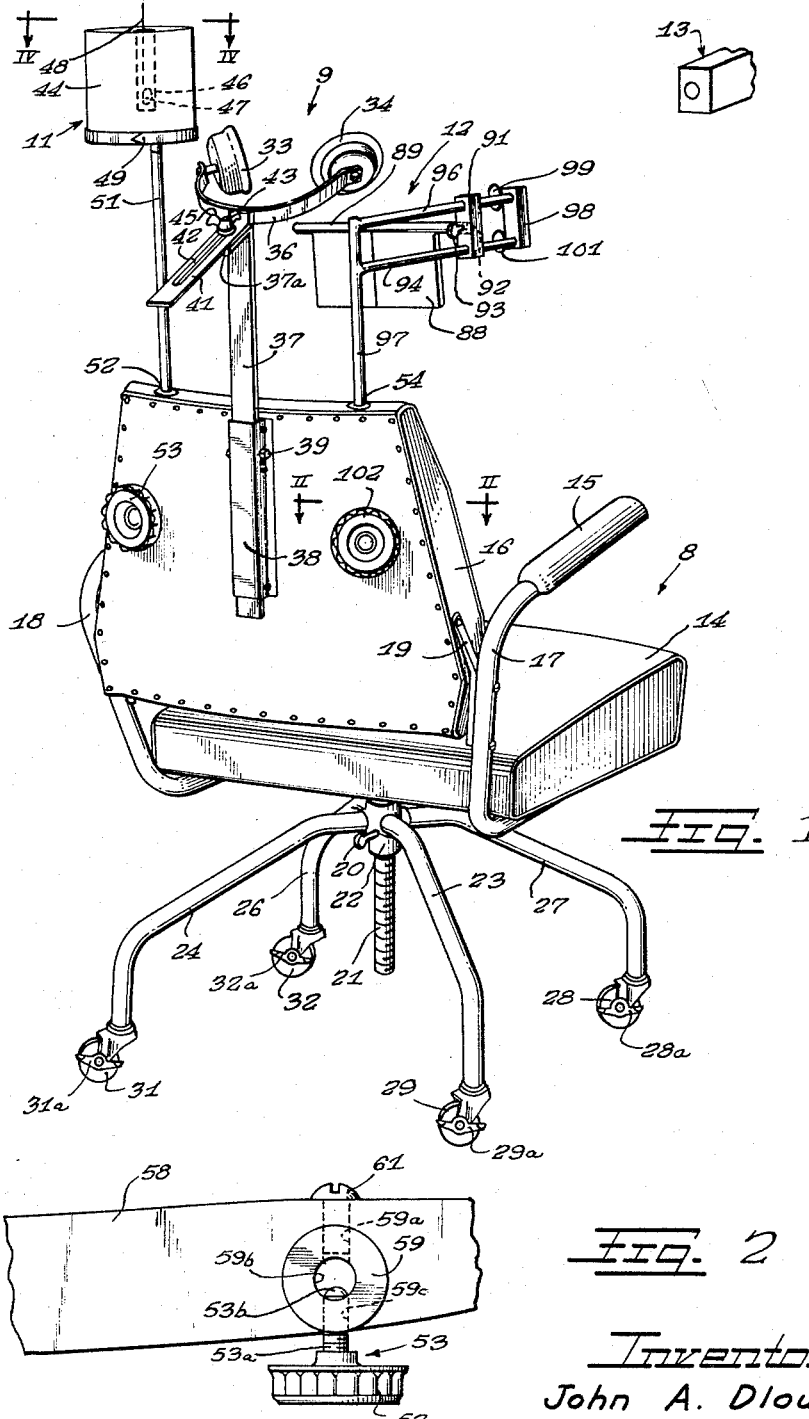
Figure 1 is a perspective view of a chair assembly embodying the principles of the present invention.
Figure 2 is a horizontal sectional view taken substantially along the line II—II and with portions of the structure removed for clarity.

The overall mechanism, as illustrated in Figure 1, includes a chair 8 in which the patient may be seated. The chair supports an adjustable head rest 9 to position the patient's head and thereby positively locate the thyroid gland as a measurement location. Adjustably mounted on the chair is a phantom 11 which may be moved to said measurement location so that a standard dose of the same radioactivity as was administered to the patient, may be measured as to its radiation count.

Also adjustably mounted on the chair is a radiation shield 12 which is adjustable to conform to the configuration of the patient's neck area and is also movable between a shielding position and a non-shielding position. The radiation is measured by a radiation detecting counter 13 which is positioned in a location of a fixed and known distance when radiation is to be measured.

An important feature of the invention is the ability of the mechanism to measure radiation with a radiation counter which is located in a location at a known distance and remains at that location for taking measurements. Since the radiation measurements must be uniform and have the greatest degree of exactness, the elimination of a variable in not having to move the counter 13 between measurements enhances the accuracy of measurement. Furthermore, this eliminates the time and effort which would be consumed in movement of the counter and improves the usefulness of the mechanism.

The chair 8 is provided with a seat 14 and a back rest 16. The seat and back rest are rigidly and fixedly located with respect to each other. The patient is supported and his head is supported to locate the thyroid gland for measuring the radiation count.

The chair is provided with curved arms 17 and 18 on either side which are secured to the bottom of the seat and which project upwardly and forwardly above the seat to provide arm rests such as 15. The back is secured between the arms 17 and 18 such as by brackets 19 which are rigidly attached to the arms and to the back rest. Various seat and back arrangements providing a rigid relation for supporting the patient's body may be used as will be appreciated by those skilled in the art. It will also be appreciated that although a chair such as shown is the preferred form for positively supporting the patient's body, other body supporting mechanism may be employed.

The chair is mounted so as to be supported on a floor area and a screw support 21 is secured to the bottom of the seat 14 and threaded into a hub 22 for adjustably raising or lowering the seat. Means such as a set screw 20 may be threaded into the hub for locking the chair against rotation. Extending outwardly and downwardly from the hub 22 are supporting legs 23, 24, 26, and 27. At the lower ends of these legs are rollers 28, 29, 31, and 32. The rollers are each provided with brakes 28a, 29a, 31a, and 32a to positively lock the chair in a fixed position relative to the radiation counter 13 once it is located.

The head rest 9 is adjustably mounted on the chair and includes head supporting pads 33 and 34 which are turned to slightly face each other and are carried by a yoke 36. The yoke is mounted at the upper end of a vertically sliding bar 37 and the bar is slidably received by a channel shaped slide 38 secured to the back surface of the chair back rest 16. A securing member 39 may be provided to lock the bar 37 in a vertically adjusted position.

The yoke is secured to a horizontally sliding bar 41 which is slidably mounted at the top of a bracket extension 37a at the top end of the bar 37. The bar 41 is provided with elongated slot 42 through which passes a bolt 43, which is secured to the bracket 37a and which receives a wing nut 45. The wing nut is tightened when the bar 41 is slid to the adjusted horizontal position of the head rest. The head rest will positively locate the patient's head with respect to his body and with these members positioned, the thyroid gland will be in a measuring location which is fixed for purposes of measuring radiation.

The phantom block 11 is adapted to carry a standard diagnostic dose of radioactive material in order that the count of the dose may be measured. The block includes a container 44 with a compartment 46 therein for holding the dose 47 which may be in the form of one or more capsules. A holder 48 may be provided to insert and withdraw the dose from the compartment 46. The holder 44 may be formed of materials such as Lucite and has a radiation characteristic substantially equal to the radiation characteristic of the patient's neck. That is, the radiation emitted from the capsule 47 will be affected by reflection, attenuation, blocking, and the like an amount equal to the effect on radiation by the patient's neck.

Figure 4:
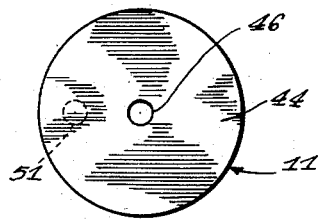
Figure 4 is a plan view taken substantially along line IV—IV of Figure 1.

The container 44 is mounted on a base 49 which is mounted eccentrically on a vertical supporting post 51, as shown in Figures 1 and 4.

The post 51 is in the form of an elongated smooth cylindrical rod which is slidably received in an opening 52 in the chair back rest 16. The interior construction of the back rest is illustrated in connection with Figures 2 and 3.

Figure 3:
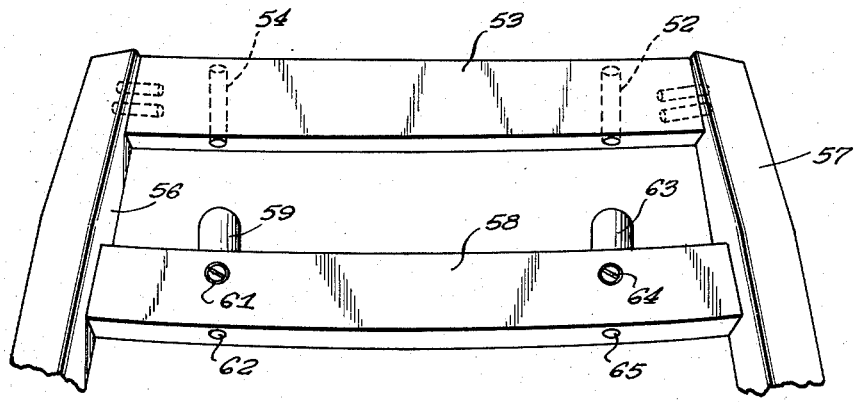
Figure 3 is a perspective view of the framework of the chair back.

Figure 3 illustrates the framework for the back rest with the padding removed. The chair, as illustrated in Figure 1, has padding applied over a framework in a well known manner and the padding may be formed of cloth, leather, or the like, suitably attached. The framework of the back rest, as illustrated in Figure 3, includes an upper horizontal bar 53 provided with vertical bore holes 52 and 54. The horizontal bar 53 is attached to side bars 56 and 57. Also extending across the side bars is a lower horizontal bar 58. This bar is provided with drilled holes extending from the upper surface to receive bearing hubs 59 and 63 which are locked in place by screws 61 and 64. The holes are continued by openings 62 and 65 which are of substantially the same diameter as holes extending through the bearing hubs 59 and 63. The hub 63 is of substantially the same construction as the hub 59 which is shown in detail in Figure 2.

The hub 59 has a first lateral opening 59a to receive the locking screw 61 which holds it in place in the bar 58. A vertical bored hole 59b slidably receives the rod 51. The rod is frictionally locked in place by a manually rotatable locking screw 53 having a rounded end 53a and threaded into a laterally threaded opening 59c of the bearing hub 59. A rounded end 53b of the screw frictionally engages the rod 51. A manually rotatable knob 53c is connected to the screw, and the operator, standing at the back of the chair, rotates the knob sufficiently to slightly release the rod 51 for sliding the phantom block 11 up or down or rotating it into position relative to the head rest 9. The screw 53 is released sufficiently to support the block in adjusted position and the block can then be slidably and rotatably positioned.

The block has an outer surface which is used as a reference surface for positioning it relatives to the head pads 33 and 34. The block may be brought against the head rest pads or may be accurately spaced therefrom depending upon the arrangement desired. The block 11 is shown in the non-measuring position in Figure 1 and when swung against the head rest is in the measuring position, wherein the radiation counter 13 will measure the radiation from a diagnostic capsule 47. When the phantom block 11 is in the measuring position, the capsule will have substantially the same location as the thyroid gland of a patient who is seated in the chair 8.

Figure 5:
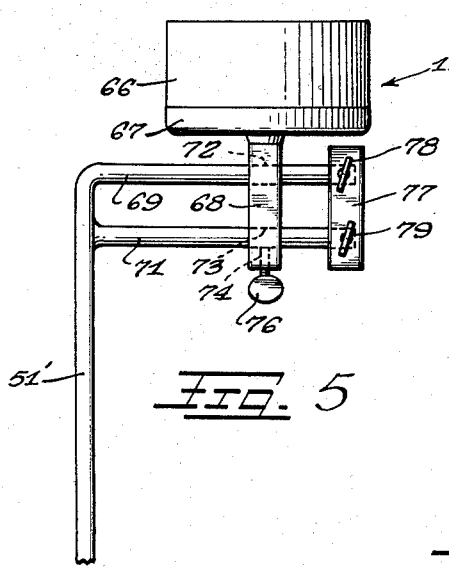
Figure 5 is an elevational view of another form of a phantom.
Figure 6:
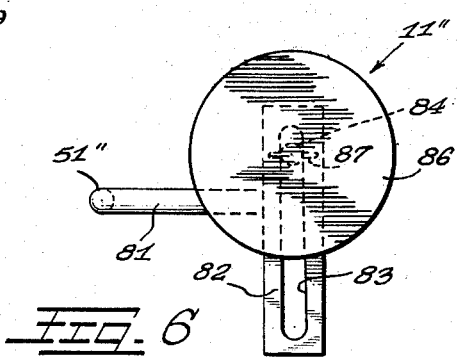
Figure 6 is a plan view of still another form of a phantom.

Alternate forms of the phantom block 11 are shown in Figures 5 and 6 with the block being indicated at 11' and 11'' as supported on a vertical rod 51' or 51'' respectively.

In the form illustrated in Figure 5, the phantom block 11' includes a container 66 mounted on a base 67. The base has a support block 68 which is slidably mounted on horizontal bars 69 and 71 which are attached to the vertical rod 51'. The block 68 is provided with lateral bored openings 72 and 73 to slide on the bars 69 and 71. The block is provided with a threaded opening 74 receiving a thumb screw 76 for locking it in lateral sliding position. With this adjustment the block can be slid laterally relative to the head rest when swung to measuring position. The block 11' can be removed from its support, and for this purpose a bar 77 has holes drilled therein and is slid over the ends of the rods 69 and 71. The bar 77 is held in place by thumb screws 78 and 79 which are threaded into the sides of the bar and which may be loosened for removing the bar and thereby sliding the block 68 carrying the container 66 off of the bars 69 and 71.

In the phantom block 11'' of Figure 6, the vertical rod 51'' carries an integral horizontal extension bar 81 and a flat plate 82 is secured to extend across its end. The plate has an elongated slot 83 and a boss 84 projects downwardly into the slot from the base 86 for the container, the container having been removed from the view of Figure 6. A thumb screw 87 threads onto the boss 84 to lock the base 86 in its container in laterally adjusted position on the plate 82. Thus, the arrangement of Figure 6 avails an adjustment in a direction at right angles to the radial adjustment possible with the arrangement of Figure 5. In some instances it may be desirable to combine the arrangements of Figures 5 and 6 to obtain a greater flexibility of adjustment.

As illustrated in Figure 1, the radiation shielding mechanism 12 includes a lead shielding plate 88 which is suspended beneath a horizontal pivot bar 89. The bar and its plate 88 are supported on a sliding block 91 which has a lateral bored hole 92 to pivotally receive the bar 89. A set screw 93 extends laterally into the hole 92 to lock the bar and shield in pivotally adjusted position. This permits the lead shield 88 to be swung about a horizontal axis to conform with the contour of the patient's throat area for blocking the radiation of the thyroid gland when the radiation of the surroundings and the rest of the patient's body is to be measured.

The block 91 is slidably mounted on horizontal bars 94 and 96 which are secured to a vertical rod 97. The rod 97 is received by the opening 54 in the chair back and extends down into the bearing block 59 of Figure 3. A manually rotatable locking screw 102 permits the operator to lock the lead shield in its vertical position and to lock it against swinging or to release the screw 102 to permit sliding movement thereof. The shield is adjustable vertically to be placed against the patient's throat and swings horizontally between a blocking position where it is located between the patient's throat and the radiation counter 13, and a non-blocking position where it is swung out of the way and the radiation from the radioactive material in the patient's thyroid will reach the counter 13.

The sliding block 91 which permits horizontal adjustment of the shield 88, may be slid off the bars 94 and 96. For this purpose a locking block 98 is provided with lateral holes and slid onto the end of the bars 94 and 96. Thumb screws 99 and 101 lock the block on the end of the bars.

While this disclosure has been directed towards the determination of the thyroid uptake, and therefore basal metabolic state of a patient, it is equally obvious that the same general technique with appropriate modifications in size and shape of the elements, can be used for the determination of the percent of an administered dose in other portions of the body. This dose may be either at a diagnostic or therapuetic level.

In using the device described for thyroid upstake, the patient receives a diagnostic dose of radioactive material which will concentrate in the thyroid, at a suitable time before the examination is to be carried out. This elapsed time may range from 2 to 36 hours. The patient is, as indicated, placed in the chair described with his head firmly positioned in the head rest. The phantom and the shield are swung completely out of the field of operation. A detector of radiation such as a scintillation counter, or a geiger tube, is placed at a known fixed distance from the patient's thyroid. A count is measured by the detector of the activity under these conditions, which represents the total activity contributed by the thyroid, by the tissue around the thyroid, by the rest of the patient's body, and by the cosmic radiation of the surrounding atmosphere.

The shield, which has been called the "B" shield, is then swung into place and positioned by means of the various adjustments both in a vertical and horizontal direction, so as to cover completely the thyroid area of the patient, without significantly covering other portions of the body. A count made under these conditions obviously represents the activity primarily from the other portions of the body and therefore the difference between these and the first count is the actual activity in the thyroid.

The patient is then removed from the chair. The phantom is moved into the position where the thyroid was, so that the activity in the phantom is as close as possible to the spot where the thyroid was. A standard dose has been placed in the phantom. A measurement under these conditions represents the total activity of the dose administered to the patient plus a small amount of cosmic radiation. To eliminate the latter from the net count, the lead "B" shield is now swung in place over the phantom and the difference represents the activity from the standard dose alone. The activity in the patient's thyroid, as measured by this set of devices, divided by the standard activity represents the thyroid uptake.

It is to be noted that the phantom must be of such a composition as to simulate the neck of the patient, that the dose acting as a standard must be the same as that administered to the patient or differing from it by a known amount, that the distance from the detector to the thyroid must be the same as from the detector to the source in the phantom, and that other conditions of geometry must be the same.

It is the purpose of the above described invention to provide, in convenient form, all devices that are necessary for carrying out such a determination, to place them in such a position that they may be used with the greatest ease, and that the sequence of events be simple so that the possibility of error is minimized.

Reviewing the above operations of the invention in steps and with reference to the parts of the apparatus, step 1 generally is for the purpose of obtaining the radiation count from the thyroid gland, the rest of the patient's body, and the surroundings.

At an elapsed time after the patient has taken the diagnostic dose of radioactive material he is placed in the chair with his head against the head rest 9 and the head rest adjusted to a comfortable position wherein the head will be firmly supported and the body will be supported. The distance from the patient's neck to the detector is accurately measured. The radioactive shield 12 is rotated on the vertical supporting rod 97 to a non-shielding position where the radiation of the patient's thyroid plus the scattered radiation from the I-131 material elsewhere in the body will reach the measuring detector 13. The total count of the patient's thyroid and entire body area is then taken. This count will, of course, include the radioactivity of the surroundings.

For step 2 the radiation shield 12 is swung to a blocking position such as is shown in Figure 1. The sliding block 91 is slid to bring the shield 88 against the patient's neck and the thumb screw 93 is loosened in order that the shield may be pivoted to lie flat against the neck area. The radiation is then measured by the scintillation counter 13 and the reading will give a count of the radiation from the radioactive material in the patient's body, less the radiation of the material in the thyroid, but including the radiation count of the surroundings. If the count taken in step 2 is subtracted from the count in step 1, the net radioactive count of the radioactive material taken up by the thyroid is determined.

For step 3 the count of the diagnostic dose given the patient is measured. A diagnostic capsule such as 47, which usually is of the same radiation count as given the patient, is placed in the phantom block 11. The container 44 is then swung eccentrically on the support rod 51 to bring the capsule to the exact location of the patient's thyroid area. The outer surface of the container 44 is used as a reference surface for reproducing the thyroid detector distance. Thus, in effect, the phantom occupies the same position with respect to the head rest as the neck of the patient did previously. The adjustment knob 53c permits vertical raising and lowering of the block 11 with respect to the head pads to accurately locate the container. The radiation count is then taken and the count is an indication of the radioactivity of the diagnostic dose 47 and of the surroundings.

For step 4 the blocking shield 12 is again swung into place and occupies the same relative position that it did with the patient. Vertical adjustment is, of course accomplished by loosening and tightening of the knob of the locking screw 102. With the arrangements of the screws attached to the control knobs, the screws have a rounded inner friction end, so that they can be frictionally tightened and the shielding member 12 or the phantom block 11 can be swung horizontally while maintaining their substantially same elevation.

With the shield 88 in front of the phantom, the count is taken by the detector 13 which is the count of the surroundings. By subtracting the count obtained in step 4 from the count of step 3 the net count of the diagnostic dose is obtained.

The net count of thyroid radiation, as obtained by steps 1 and 2, is then divided by the count of the diagnostic dose as obtained by steps 3 and 4 and this yields the percent of thyroid uptake. This indicates the activity of the thyroid gland which avails the basic metabolic rate of the patient and also may be used as an indication of the presence of tumors and other physical disturbances.

As an example, for purpose of explaining the measuring and not to be limiting as to the counts which may be obtained, in step 1 a total count of 2,000 may be obtained which equals the total radiation of the radioactive material in the patient, in the thyroid gland and the cosmic ray radiation of the surrounding area. In step 2, for example, a count of 500 might be obtained which would be the count from the patient's body outside of the thyroid gland and including the count of the surrounding area. The thyroid count would then be 1,500. In step 3 a count of 5,000 might be obtained and in step 4 a count of 200. This would indicate that the radioactive diagnostic dose had a radiation count of 4,800. The percentage of thyroid uptake would then be, 1,500/4,800 or approximately 31%.

Thus, it will be seen that we have provided an improved method and apparatus for clinically measuring the degree of thyroid function which meets the objectives and advantages hereinbefore set forth.

The apparatus and method are susceptible of simple rapid use and avail an accurate measure of basal metabolic rate of the individual.

An important feature of the invention is its capability of measurement with the greatest degree of exactness. The matter of error is extremely important and is reduced to a minimum.

We have, in the drawings and specification, presented a detailed disclosure of the preferred embodiments of our invention, and it is to be understood that we do not intend to limit the invention to the specific forms disclosed, but intend to cover all modifications, changes and alternative constructions and methods falling within the scope of the principles taught by our invention.

We claim as our invention:

1. A device for measuring the uptake of a radioactive substance such as radio-iodine by a portion of the body such as the thyroid, with detecting equipment comprising, a chair for supporting the body of the patent and having as integral parts thereof, an adjustable head rest which fixes the position of the thyroid gland with respect to the detecting equipment, an adjustable phantom to simulate the neck of the patient and to provide for recording by the detecting equipment the equivalent of the radiation which would be given by that element which was administered in an original diagnostic dose, said phantom being adjustable so that it may be easily placed in exactly the same position occupied by the neck of the patient during measurements made on him with his thyroid gland positioned by the head rest, a shield of a material such as lead of suitable size so that it will eliminate the radiation derived from the thyroid without appreciably influencing that given off by the radioactivity elsewhere in the body, said shield being mechanically arranged so that it can be removed entirely from the field of measurement or placed over the thyroid area of the patient or over the phantom, said device including the chair and parts being arranged so that the necessary set of steps for determination of the thyroid uptake can be achieved with a maximum accuracy, certainty, and convenience.

2. A mechanism for measuring the radioactive uptake of the thyroid gland of a patient with a detection device in a fixed location comprising in combination a body supporting chair for positioning the patient in a fixed body location, a head rest on said chair for locating the head of the patient relative to the body to position the thyroid gland in a fixed measuring location, a radiation blocking lead shield having a dimension such as to cover the area occupied by the thyroid, and means for adjustably movably supporting said shield on said chair for movement between a position adjacent the throat of the patient wherein radiation from the patient's thyroid to the detection device is blocked and the radiation of the surroundings and patient's body with the exception of the throat area may be measured, and a position in which the shield is out of the path of rays from the thyroid to the detection device, whereby the radiation of the entire body including the thyroid may be measured.

3. A device for measuring the uptake of a radioactive material of a thyroid gland of a patient with a large degree of exactness using a measuring device located at a fixed known distance from the thyroid gland, the mechanism comprising a chair provided with a body support and a head rest for a patient, means for adjustably positioning the head rest to position the patient's head with respect to the measuring device, a phantom member for containing a standard dose of radioactive material, said member having a radiation characteristic substantially the same as the patient's neck, means connected to said chair for adjustably supporting said phantom member in the same position as the patient's neck relative to the adjusted head rest, whereby the radiation from the neck of the patient is first measured and then compared with a standard dose in said phantom under the same geometrical conditions as the neck of the patient.

4. A device for measuring the uptake of radioactive material by a body part of a patient with a radiation measuring device comprising a chair for supporting the body of a patient, a body part positioning member adjustably attached to the chair for adjusting to locate said body part in a fixed measuring position when a patient is located in the chair, a phantom body part member having a reference surface for positioning said phantom member relative to said body part positioning member and having a support for holding a quantity of radioactive material in a location relative to said reference surface in the same position that said patient's body part will assume when the body part is located by said body part positioning member, and means for adjustably supporting said phantom member in the position of the patient's body part.

5. A device for measuring the uptake of radioactive material of a body part of a patient having taken a standard dose of radioactive material comprising a body support shaped to position the patient in a predetermined body position whereby a part of the patient's body will be located in a fixed measuring location, a phantom support for holding a quantity of radioactive material having a standard radiation count, a holder for said phantom support positioned to removably locate said phantom support at said fixed measuring location corresponding to said measuring location of said body part of the patient positioned by said body support, and means for removably supporting a radiation shield in a shielding location between said measuring location and a radiation measuring device whereby the radiation of said treatment quantity of material may be reference measured and the radiation from the patient's entire body may be subsequently measured wih the shield removed from said shielding location and whereby the radiation from the room and from the rest of the patient's body may be thereafter measured with the use of said shield in said shielding location.

6. A device for measuring the uptake of a standard dose of radioactive material by a thyroid gland of a patient with a radiation counter comprising in combination a chair provided with a body support and a head rest for a patient for positively locating the thyroid gland in a fixed measuring location, a phantom member having surfaces for locating the position thereof with respect to the body support in said measuring location and having means for holding a standard dose of radioactive material at substantially the location of the patient's thyroid when said surfaces are used to position the phantom member in the position of the patient's thyroid, an adjustable holder for said phantom member to move the member to the patient's position, a radiation shield movable between a shielding position between the measuring device and said measuring location and a non-shielding location wherein the measuring device receives radiation from said measuring location whereby the radiation of said standard dose in the phantom member may be first measured and the radiation subsequently measured from the radioactive material in the thyroid of the patient and whereby the radiation from the surroundings and radiation from the rest of the patient's body may be measured with the use of said shield in said shielding position, and means for adjustably supporting said radiation shield.

7. A device for measuring the uptake from a standard dose of radioactive material by a thyroid gland of a patient with a radiation measuring device comprising in combination a chair provided with a back and seat for a body support, an adjustable head rest mounted on said back for positioning the head of the patient to locate the thyroid gland in a measuring position, a phantom member mounted on a movable support on the chair back for movement into said measuring position and having surfaces for engaging the head rest and having a means for supporting a standard dose of radioactive material, and a manually operable phantom adjustment member on the back of said chair for accommodating movement of the phantom member to a position corresponding to the head of the patient against the head rest whereby the radiation from said phantom member can be first measured and the radiation from the thyroid of a patient can be subsequently measured.

8. The method of measuring the uptake of radioactive material from a standard dose by a patient's thyroid comprising the steps of positioning the entire body of a patient having been pretreated with a standard dose of radioactive material and then positioning the thyroid gland in a fixed measuring position and measuring the radiation count at a predetermined detecting location, positioning a standard dose of radioactive material in said measuring location measuring the radiation count of said standard dose in the measuring location, and substantially blocking radiation between said thyroid gland in said measuring location and measuring the radiation from the surroundings and from the rest of the patient's body.

9. The method of measuring the uptake of radioactive material from a standard dose by a thyroid gland of a patient in an adjustable chair having a phantom member for supporting a standard dose of radioactive material with a radiation measuring device and a radiation blocking shield, which comprises positioning the phantom member in a measuring location corresponding with the location of the thyroid of a patient in the chair, measuring the radiation count from said phantom member, positioning a patient having taken a standard dose in the chair and measuring the radiation count from said patient, and positioning the lead shield between the patient's thyroid gland and the measuring device and measuring the radiation from the surroundings and the radiation from the rest of the body of the patient.

10. A mechanism for measuring the uptake of a standard dose of radioactive material by a thyroid gland of a patient using a radioactive measuring device comprising, a chair provided with a body support and a head rest for a patient, means for adjustably mounting the head rest on the chair for positioning the head rest in a fixed measuring position relative to said chair whereby the position of the patient's neck in the chair is positively determined, a phantom member having a characteristic for affecting radiation substantially the same as the characteristic of the patient's neck relative to the thyroid gland, said member having a surface for engagement with said head rest and a support surface for a radioactive diagnostic dose, means for adjustably supporting said phantom member in the position of the patient's neck relative to the adjusted head rest in said measuring position whereby the radiation of said dose may be first reference measured, said measuring location and the radiation from the patient's thyroid gland measured after removal of said phantom member and placement of a patient in said support.

11. A device for measuring the uptake of radioactive material from a standard dose by a thyroid gland of a patient with a radiation detection device comprising in combination a chair for supporting the body of a patient, a head rest for said chair positively locating the head of the patient to position the patient's thyroid in a measuring location, a radiation blocking shield for positioning against the patient's neck to block radiation from the thyroid to the detection device, a first support means for the shield adjustably supporting the shield for rotation about a horizontal axis whereby the shield may be vertically tilted to conform to the contour of the patient's neck, and a second support means mounted on the chair and supporting the shield for movement between a blocking location against the patient's neck and a non-blocking location out of the path of radiation between the patient's thyroid and detection device.

12. A mechanism for measuring the uptake of radioactive material from a standard dose by a thyroid gland of a patient with a radiation detection device comprising in combination a patient supporting chair having a seat and a back to support the body of a patient, an adjustable head rest for the patient, means mounted on the chair for supporting and vertically adjusting the position of the head rest, means for horizontally adjusting the position of said head rest, a phantom member having a cavity for receiving a standard dose of radioactive material and having a radiation modifying characteristic substantially equivalent to the characteristic of the patient's neck for affecting radiation from the thyroid, a vertical post eccentrically connected to the phantom member for swinging the phantom member relative to the detecting device and the head rest into the position of the patient's thyroid, or to a position remote from the head rest, means defining a vertical opening in the chair back for receiving said post, an adjustable hand screw fitted into the back of the chair for frictionally engaging said post to lock the position of the post to permit frictional adjustable movement thereof, a radiation blocking lead shield for positioning between the patient's thyroid and the detection device, a horizontal support bar connected to said lead shield for pivoting the shield about a horizontal axis to adjust its position to the patient's neck, a horizontal slide supporting said horizontal bar and movable to adjust the horizontal spacing between the lead shield and the patient's neck, a vertical rod for supporting said horizontal slide, means defining an opening in the back of the chair for receiving said vertical rod, and manually adjustable screw means for frictionally engaging said rod and fitted into the back of the chair whereby the rod may be slid vertically or rotated and locked in position for movement between a radiation blocking position and a non-blocking position.

13. The method of measuring the uptake of radioactive material from a standard dose by a patient's thyroid which comprises positively supporting and positioning the entire body of a patient having received a standard dose of radioactive material and positively positioning the thyroid area, measuring the radiation from the entire body of the patient and the surrounding room area, blocking the radiation from the patient's thyroid and measuring the radiation of the remainder of the patient's body and surrounding room area, locating a standard dose equivalent to that given the patient in the same location as the patient's thyroid when it was measured and measuring the radiation of said dose, and subsequently blocking the radiation from said dose and measuring the radiation of the surrounding room area whereby the net uptake of radioactive material by the thyroid can be determined to ascertain the basal metabolism of the patient.

14. A mechanism for measuring the uptake of radioactive material from a standard dose by a thyroid gland of a patient with a radiation detection device comprising in combination a chair provided with a back and seat for a body support, an adjustable head rest mounted on said chair for positioning the head of the patient to locate the thyroid gland in a measuring position, a phantom member mounted on a chair for movement into said measuring position and having surfaces for positioning the member relative to the head rest and having means for supporting a standard diagnostic quantity of radioactive material, and a holder for adjustably supporting said phantom member on said chair.

15. An assembly for measuring radioactive uptake with a radiation device in accordance with claim 14 in which said holdler includes a support eccentrically and pivotally connected to the phantom member accommodating pivotal movement about a vertical axis.

16. An assembly for measuring radioactive uptake with a radiation device in accordance with claim 14 in which said holder includes a horizontal slide support accommodating sliding movement of the phantom member on the holdler relative to the head rest.

17. An assembly for measuring the uptake with a radioactive material by a body part of a patient with a radiation measuring device at a location at a known distance from said body part, comprising a body support shaped to position a patient in a predetermined position whereby the body part of the patient will be located in a fixed measuring location, a phantom support for holding a standard dose of radioactive material, and a holder for said phantom support for removably locating said phantom support at said measuring location of the body part whereby the radiation of said standard dose of material may be first reference measured and the radiation from said body part measured after removal of said phantom support and placement of a patient in said support.

References Cited in the file of this patent

UNITED STATES PATENTS 2,264,410    Schier _____ Dec. 2, 1941